United States Patent
Sakamoto et al.

(10) Patent No.: US 7,011,905 B2
(45) Date of Patent: Mar. 14, 2006

(54) SOLID POLYMER ELECTROLYTE MEMBRANE, SOLID POLYMER ELECTROLYTE FUEL CELL USING THE MEMBRANE AND METHOD OF FABRICATING THE SAME

(75) Inventors: Shigeru Sakamoto, Ota (JP); Hiroko Sanda, Gunma (JP); Hirosaku Nagano, Otsu (JP); Hidekazu Kuromatsu, Settsu (JP); Kiyoyuki Namura, Nagaokakyo (JP)

(73) Assignees: Sanyo Electric Co., Ltd., Osaka (JP); Kaneka Corporation, Osaka (JP)

(*) Notice: Subject to any disclaimer, the term of this patent is extended or adjusted under 35 U.S.C. 154(b) by 0 days.

(21) Appl. No.: 11/003,598

(22) Filed: Dec. 6, 2004

(65) Prior Publication Data

US 2005/0181285 A1    Aug. 18, 2005

Related U.S. Application Data

(63) Continuation of application No. PCT/JP03/15414, filed on Dec. 2, 2003.

(30) Foreign Application Priority Data

Dec. 2, 2002    (JP) ............................. 2002-350506

(51) Int. Cl.
  *H01M 8/10*    (2006.01)

(52) U.S. Cl. ............................. 429/33; 429/30; 429/40; 429/41; 429/44; 429/310; 204/296; 29/730; 29/623.3; 29/623.5; 521/27

(58) Field of Classification Search ................... 429/30, 429/33, 40, 41, 44, 310; 204/296; 29/623.3, 29/623.5, 730; 521/27
See application file for complete search history.

(56) References Cited

U.S. PATENT DOCUMENTS 5,688,614 A * 11/1997 Li et al. ..................... 429/310
6,562,446 B1 * 5/2003 Totsuka ................... 428/304.4

FOREIGN PATENT DOCUMENTS

| JP | 06-231782 | 8/1994 |
|---|---|---|
| JP | 07-335233 | 12/1995 |
| JP | 10-045913 | 2/1998 |
| JP | 2000-251906 | 9/2000 |
| JP | 2000-340031 | 12/2000 |
| JP | 2002-063915 | 2/2002 |
| JP | 2002-105200 | 4/2002 |
| JP | 2002-216796 | 8/2002 |
| JP | 2002-216802 | 8/2002 |

* cited by examiner

*Primary Examiner*—Bruce F. Bell
(74) *Attorney, Agent, or Firm*—McDermott Will & Emery LLP

(57) ABSTRACT

A solid polymer electrolyte membrane and a catalytic layer are properly assembled even when the solid polymer electrolyte membrane and an ion exchange resin in the catalytic layer are formed of different materials. In a fuel cell, a solid polymer electrolyte membrane 20 is provided with a first solid polymer electrolyte membrane 200, and second solid polymer electrolyte membranes 202 and 204 provided at respective sides thereof. The second solid polymer electrolyte membranes 202 and 204 are formed of the same material as the ion exchange resin (not shown) included in a catalytic layer 26 and a catalytic layer 30.

22 Claims, 9 Drawing Sheets

← HOT PRESS (HIGH TEMPERATURE)

← HOT PRESS (LOW TEMPERATURE)

| | FIRST SOLID POLYMER ELECTROLYTE MEMBRANE | SECOND OR THIRD SOLID POLYMER ELECTROLYTE MATERIAL | HOT PRESS TEMPERATURE | | RESULT | |
|---|---|---|---|---|---|---|
| | | | AFTER SECOND SOLID POLYMER ELECTROLYTE MEMBRANES 202 AND 204 ARE FORMED | AFTER SANDWICHING MEMBRANE BY FUEL ELECTRODE 22 AND AIR ELECTRODE 24 | METHOD OF EVALUATION 1 | METHOD OF EVALUATION 2 |
| EXAMPLE 3 | SULFONATED POLYPHENYLENE SULFIDE | NAFION | NONE | 150 | ○ | × |
| EXAMPLE 4 | SULFONATED POLYPHENYLENE SULFIDE | NAFION | NONE | 180 | ○ | ○ |
| EXAMPLE 5 | SULFONATED POLYPHENYLENE SULFIDE | NAFION | NONE | 170 | ○ | ○ |
| EXAMPLE 6 | SULFONATED POLYPHENYLENE SULFIDE | NAFION | 180 | 150 | ○ | ○ |
| EXAMPLE 7 | SULFONATED POLYETHERETHERKETONE | NAFION | NONE | 130 | ○ | × |
| EXAMPLE 8 | SULFONATED POLYETHERETHERKETONE | NAFION | NONE | 150 | ○ | ○ |
| COMPARATIVE EXAMPLE 2 | SULFONATED POLYPHENYLENE SULFIDE | NONE | NONE | 150 | × | × |
| COMPARATIVE EXAMPLE 3 | SULFONATED POLYPHENYLENE SULFIDE | NONE | NONE | 180 | × | × |
| COMPARATIVE EXAMPLE 4 | SULFONATED POLYETHERETHERKETONE | NONE | NONE | 130 | × | × |
| COMPARATIVE EXAMPLE 5 | SULFONATED POLYETHERETHERKETONE | NONE | NONE | 150 | × | × |

SOLID POLYMER ELECTROLYTE MEMBRANE, SOLID POLYMER ELECTROLYTE FUEL CELL USING THE MEMBRANE AND METHOD OF FABRICATING THE SAME

This is a continuation of International Application PCT/JP03/15414, filed Dec. 2, 2003.

TECHNICAL FIELD

The present invention relates to a solid polymer electrolyte membranes, a fuel cell using the membrane and a method of fabricating the same.

BACKGROUND TECHNOLOGY

In recent years, attention is paid to fuel cells characterized by high energy conversion efficiency and not producing hazardous materials as a result of generating electricity. A solid polymer electrolyte fuel cell operating at a temperature of 100° C. or lower is known as one type of such fuel cells.

A solid polymer electrolyte fuel cell is a power generating device that has a basic structure in which a solid polymer electrolyte membrane is sandwiched between a fuel electrode and an air electrode. Hydrogen is supplied to the fuel electrode and oxygen is supplied to the air electrode. A solid polymer electrolyte fuel cell generates electricity according to the following electrochemical reaction.

Fuel electrode: $H_2 \rightarrow 2H^+ + 2e^-$ (1)

Air electrode: $\frac{1}{2}O_2 + 2H^+ + 2e^- \rightarrow H_2O$ (2)

Each of the fuel electrode and the air electrode is composed of a laminate of a catalytic layer and a gas diffusion layer. The catalytic layers of the electrodes are opposed to each other, sandwiching the solid polymer electrolyte membrane, thus constituting the fuel cell. The catalytic layer is formed by bonding catalyst-carrying carbon particles on an ion exchange resin. The gas diffusion layer provides a passage for oxygen or hydrogen. Generation of electricity takes place in a triphasic interface between the catalyst in the catalytic layer, the ion exchange resin and a reactant (hydrogen or oxygen).

At the fuel electrode, hydrogen included in the supplied fuel is split into hydrogen ions and electrons according to the equation (1) shown above. Hydrogen ions move toward the air electrode via the interior of the solid polymer electrolyte membrane. Electrons move toward the air electrode via an external circuit. At the air electrode, oxygen included in the oxidant supplied to the air electrode reacts with hydrogen ions and electrons arriving from the fuel electrode, so as to produce water according to the equation (2) shown above. As a result of electrons moving from the fuel electrode to the air electrode, electric power is retrieved.

In the related art, the solid polymer electrolyte membrane is formed of fluorinated polymer material such as perfluoroacid polymers including Nafion (TM) from DuPont, Flemion (TM) from Asahi Glass Company and Aciplex (TM) from Asahi Kasei Corporation.

A problem with fluorinated polymers is that production thereof is difficult and expensive. This has created a hurdle for reduction to practice and commercialization of a fuel cell for home use, automotive use and civilian use. Furthermore, fluorinated polymer materials such as Nafion present a problem in that moisture control is difficult and heat endurance is poor.

In recent years, development of a solid polymer electrolyte fuel cell of a type called a direct methanol fuel cell (hereinafter, referred to as DMFC), in which methanol is directly supplied as fuel to a fuel electrode, is underway. A related-art fluorinated polymer material to form a solid polymer electrolyte is characterized by a relatively poor capability to block methanol. When a fluorinated polymer is used as an electrolyte membrane in a DMFC, crossover of methanol occurs so that a desired cell characteristic cannot be obtained.

Accordingly, there is a need for development of a new solid polymer electrolyte membrane in which the aforementioned problem is eliminated. For example, a patent document 2 discloses use of non-fluorinated polymer of the sulfonic acid type which, does not contain fluorine, as a solid polymer electrolyte material to form a solid polymer electrolyte membrane. A patent document 3 and a patent document 4 describe use of non-fluorine polymer of the sulfonic acid type which does not contain fluorine, as a solid polymer electrolyte material to form an electrolyte membrane having an excellent capability to block alcohol such as methanol.

Patent document 1: Japanese Laid-Open Patent Application No. 2002-63915

Patent document 2: Japanese Laid-Open Patent Application No. 10-45913

Patent document 3: Japanese Laid-Open Patent Application No. 2002-105200

Patent document 4: Japanese Laid-Open Patent Application No. 2002-216802

DISCLOSURE OF THE INVENTION

Using the non-fluorinated polymer of the sulfonic acid type to form a solid polymer electrolyte membrane, however, presents a problem in that strength of assembly of the membrane and the heterologous solid polymer electrolyte material included in the catalytic layer is unfavorable. Use of a heterologous material causes an assembly of the solid polymer electrolyte membrane and a catalytic layer to be become poor. A solid polymer electrolyte material formed of fluorinated polymer differs from a solid polymer electrolyte material of non-fluorinated polymer in glass transformation temperature and melting temperature so that sufficiently strong assembly is difficult. For example, when the glass transformation temperature and melting temperature of a solid polymer electrolyte material of non-fluorinated polymer are higher than those of a solid polymer electrolyte material of fluorinated polymer, and when the materials are assembled in a hot press process at a relatively low temperature, an interface with the catalyst and the solid polymer electrolyte material of fluorinated polymer in the porous catalytic layer cannot be established, because the solid polymer electrolyte material of non-fluorinated polymer exhibits poor fluidity. When a solid polymer electrolyte membrane formed of a solid polymer electrolyte material of non-fluorinated polymer characterized by a high glass transformation temperature and melting temperature is bonded to an electrode that includes a polymer electrolyte material of fluorinated polymer characterized by a low glass transformation temperature and melting temperature, to form an assembly, the surface of the catalytic layer may not be flat, and the quantity of the polymer electrolyte material in the catalytic layer is limited. In these cases, the aforementioned problem is more serious.

When the solid polymer electrolyte membrane and the catalytic layer are not assembled properly, conduction of hydrogen ions to the triphasic interface becomes insufficient so that the performance of the fuel cell drops. When the materials are assembled in a hot press process at a relatively high temperature, conductivity of hydrogen ions is lost due to, for example, the clustering structure of the solid polymer electrolyte material of fluorinated polymer being destroyed, causing a drop in the performance of the fuel cell. To resolve these problems with assembly, a technique is used to impregnate a solid polymer electrolyte material of non-fluorinated polymer with a catalytic layer and then bond the material to a solid polymer electrolyte membrane formed of a solid polymer electrolyte material of non-fluorinated polymer, in order to form an assembly. A problem with this technique is that the solid polymer electrolyte material is excessively so abundant in the catalytic layer that the cell performance drops as a result of gas diffusion being prevented.

In view of the circumstance described above, an object of the present invention is to provide a solid polymer electrolyte fuel cell and a method of fabricating the same, in which no thermal damage is caused to the solid polymer electrolyte membrane and the solid polymer electrolyte material, and in which the membrane and the catalyst layer are assembled properly, even when the solid polymer electrolyte membrane and the catalytic layer are formed of different solid polymer electrolyte materials. Another object of the present invention is to provide a solid polymer electrolyte fuel cell comprising a solid polymer electrolyte membrane with high heat endurance and a method of fabricating the same. Still another object of the present invention is to provide a low-cost solid polymer electrolyte fuel cell and a method of fabricating the same. Yet another object of the present invention is to provide a solid polymer electrolyte membrane used in the solid polymer electrolyte fuel cell as described above.

The present invention provides a solid polymer electrolyte membrane used in a solid polymer electrolyte fuel cell, comprising: a first solid polymer electrolyte membrane; and a second solid polymer electrolyte membrane provided at least on one surface of the first solid polymer electrolyte membrane and formed of a material different from that for the first solid polymer electrolyte membrane.

By constructing the solid polymer electrolyte membrane as described above, the first solid polymer electrolyte membrane may be formed of a highly heat resistant material, a low-cost material or a material characterized by low methanol permeability, while the second solid polymer electrolyte membrane may be formed of a material highly adherent to an electrode. In this way, performance of the solid polymer electrolyte membrane is improved. By using such a solid polymer electrolyte membrane, heat resistance of the solid polymer electrolyte fuel cell is improved and strength of assembly is improved.

The first solid polymer electrolyte membrane may be formed of a material having softening temperature higher than that of the material forming the second solid polymer electrolyte membrane. Softening temperature may be defined as glass transformation temperature or melting temperature. The first solid polymer electrolyte membrane may be formed of a material in which glass transformation temperature is undefined.

With this, adherence between the second solid polymer electrolyte membrane and the electrode is improved and heat resistance of the solid polymer electrolyte membrane is improved, in the process of assembling the second solid polymer electrolyte membrane and the electrode by heating them and applying pressure to them (hot press).

The first solid polymer electrolyte membrane may be formed of a material insoluble to solvent. With this, solvent resistance of the solid polymer electrolyte membrane is improved.

The first solid polymer electrolyte membrane of the solid polymer electrolyte membrane according to the invention may be formed of a solid polymer electrolyte material of non-fluorinated polymer.

The first solid polymer electrolyte membrane of the solid polymer electrolyte membrane according to the invention may be formed of sulfonated polyphenylene sulfide including a configuration represented by the following general formula, where n is an integer between 1 and 4.

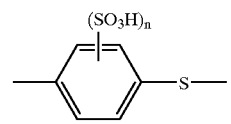

The second solid polymer electrolyte membrane of the solid polymer electrolyte membrane according to the invention may be formed of a solid polymer electrolyte material of fluorinated polymer.

The present invention provides a solid polymer electrolyte fuel cell comprising: a solid polymer electrolyte membrane; an electrode provided on the solid polymer electrolyte membrane, wherein the solid polymer electrolyte membrane includes: a first solid polymer electrolyte membrane; a second solid polymer electrolyte membrane provided between the electrode and the first solid polymer electrolyte membrane and formed of a material different from a material forming the first solid polymer electrolyte membrane, wherein the electrode includes catalyst and a third solid polymer electrolyte material having softening temperature closer to that of the second solid polymer electrolyte membrane than that of the first solid polymer electrolyte membrane.

With this, adherence between the second solid polymer electrolyte membrane and the electrode is improved, in the process of assembling the second solid polymer electrolyte membrane and the electrode by heating them and applying pressure to them (hot press).

The second solid polymer electrolyte membrane of the solid polymer electrolyte fuel cell according to the present invention may be formed of the same material as the third solid polymer electrolyte membrane.

The third solid polymer electrolyte material is ion exchange resin. The present invention ensures that the membrane and thee catalyst are assembled properly, even when the solid polymer electrolyte membrane and the catalytic layer are formed of different solid polymer electrolyte materials since there is interposed the second solid electrolyte membrane formed of a material having softening temperature close to that of the material forming the electrode. Since the second solid polymer electrolyte membrane formed of a material different from that of the first solid polymer electrolyte membrane is in face contact with the first solid polymer electrolyte membrane, the membranes are assembled properly. Furthermore, the solid polymer electrolyte material in the electrode and the second solid polymer electrolyte membrane are assembled properly irrespective of their surface configuration since they are homogeneous and have equivalent fluidized temperature. Moreover, in comparison with the related-art method of impregnating a solid polymer electrolyte material with an electrode, the solid polymer electrolyte material in the catalytic layer is prevented from being excessively abundant so that gas diffusion in the catalytic layer does not suffer and assembly can occur properly.

The first solid polymer electrolyte membrane of the solid polymer electrolyte fuel cell according to the present invention may be formed of a material having softening temperature higher than that of the material forming the second solid polymer electrolyte membrane.

The first solid polymer electrolyte membrane of the solid polymer electrolyte fuel cell according to the present invention may be formed of a solid polymer electrolyte material of non-fluorinated polymer.

The first solid polymer electrolyte membrane of the solid polymer electrolyte fuel cell according to the present invention may be formed of sulfonated polyphenylene sulfide including a configuration represented by the following general formula, where n is an integer between 1 and 4.

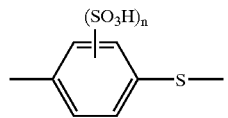

The second solid polymer electrolyte membrane of the solid polymer electrolyte fuel cell according to the present invention may be formed of a solid polymer electrolyte material of fluorinated polymer.

The present invention provides a method of fabricating a solid polymer electrolyte membrane used for a solid polymer electrolyte fuel cell, comprising the steps of: forming, at least on one side of a first solid polymer electrolyte membrane, a second solid polymer electrolyte membrane formed of a material different from that of the first polymer electrolyte membrane.

In the method of fabricating a solid polymer electrolyte membrane according to the present invention, the step of forming the second solid polymer electrolyte membrane may include a step of applying, to at least one surface of the first solid polymer electrolyte membrane, a first liquid material that includes the second solid polymer electrolyte material and solvent dissolving the second solid polymer electrolyte material or allowing the second solid polymer electrolyte material to be dispersed in the solvent.

In the method of fabricating the solid polymer electrolyte membrane according to this invention, the step of forming the second solid polymer electrolyte membrane may include a step of removing the solvent after having applied the first liquid material.

In the method of fabricating the solid polymer electrolyte membrane according to this invention, concentration of the second solid polymer electrolyte material in the first liquid material is 2% or higher by weight and 20% or lower by weight. Viscosity of the first liquid material is adjusted properly and ease of handling is improved, by controlling the concentration of the second solid polymer electrolyte material in such a range. Moreover, the membrane is made to have a desired thickness.

In the method of fabricating the solid polymer electrolyte membrane of this invention, the step of forming the second solid polymer electrolyte membrane may be preceded by a step of forming the first solid polymer electrolyte membrane by melt-extruding the first solid polymer electrolyte material. With this, the first solid polymer electrolyte material may be formed of a material insoluble to solvent, so that solvent resistance of the first solid polymer electrolyte membrane is improved.

The present invention provides a method of fabricating a solid polymer electrolyte fuel cell, comprising steps of: forming, at least on one side of a first solid polymer electrolyte membrane, a second solid polymer electrolyte membrane formed of a second solid polymer electrolyte material different from that of the first polymer electrolyte membrane; and forming an electrode that includes catalyst and a third solid polymer electrolyte material, on the second solid polymer electrolyte membrane, wherein the second solid polymer electrolyte material has softening temperature closer to that of the third solid polymer electrolyte material than that of the first solid polymer electrolyte membrane. The step of forming the electrode may include a step of assembling the catalytic layer, formed on the gas diffusion layer, and the second solid polymer electrolyte. According to the present invention, the solid polymer electrolyte membrane and the electrode are assembled properly, even when the solid polymer electrolyte membrane is formed of a material different from the solid polymer electrolyte material to form the electrode, since there is interposed the second solid polymer electrolyte membrane formed of a material having similar softening temperature as the solid polymer electrolyte material forming the electrode.

In the method of fabricating a solid polymer electrolyte fuel cell according to the present invention, the step of forming the second solid polymer electrolyte membrane may include a step of applying, to at least one surface of the first solid polymer electrolyte membrane, a first liquid material that includes the second solid polymer electrolyte material and solvent dissolving the second solid polymer electrolyte material or allowing the second solid polymer electrolyte material to be dispersed in the solvent.

In the method of fabricating the polymer electrolyte fuel cell according to the present invention, the step of forming the second solid polymer electrolyte membrane may include a step of removing solvent after having applied the first liquid material. The solvent may be at least one kind of material selected from a group comprising isopropyl alcohol, methanol, ethanol, propanol, and water.

In the method of fabricating the polymer electrolyte fuel cell according to the present invention, concentration of the second solid polymer electrolyte material in the first liquid material is 2% or higher by weight and 20% or lower by weight.

In the method of fabricating the polymer electrolyte fuel cell according to the present invention, the step of forming the second solid polymer electrolyte membrane may be preceded by a step of forming the first solid polymer electrolyte membrane by melt-extruding the first solid polymer electrolyte material.

In the method of fabricating the polymer electrolyte fuel cell according to the present invention, the third solid polymer electrolyte material may be the same as the second solid polymer electrolyte material.

In the method of fabricating the polymer electrolyte fuel cell according to the present invention, the step of forming the electrode may be performed in a state in which the surface of the second solid polymer electrolyte membrane is in a fluidized condition.

In this way, adherence between the second solid polymer electrolyte membrane and the electrode is improved since the catalyst in the electrode penetrates the fluid surface of the second solid polymer electrolyte membrane.

In the method of fabricating the polymer electrolyte fuel cell according to the present invention, a second liquid material that includes the catalyst and the third solid polymer electrolyte material may be applied to the surface of the second solid polymer electrolyte membrane. When the second liquid material is applied, the surface of the second solid polymer electrolyte membrane may either be in a fluidized or dried condition.

In this way, adherence between the second solid polymer electrolyte membrane and the electrode is improved since the liquid material including catalyst is attached to the second solid polymer electrolyte membrane. Furthermore, in a case in which the surface of second solid polymer electrolyte membrane is in a fluidized condition, adherence between the second solid polymer electrolyte membrane and the electrode is improved since the catalyst in the electrode penetrates the fluid surface of the second solid polymer electrolyte membrane.

In the method of fabricating the polymer electrolyte fuel cell according to the present invention, the step of forming the electrode may include a step of dispersing the catalyst on the surface of the second solid polymer electrolyte membrane, and a step of applying a second liquid material that includes the third solid polymer electrolyte material to the surface of the second solid polymer electrolyte membrane on which the catalyst is diffused.

By applying the second liquid material including the third solid polymer electrolyte material to the top of the catalyst attached to the second solid polymer electrolyte membrane, adherence between the second solid polymer electrolyte membrane and the catalytic layer is improved. Furthermore, when the surface of the second solid polymer electrolyte membrane is in a fluidized condition, adherence between the second solid polymer electrolyte membrane and the catalytic layer is improved since the second liquid material including the third solid polymer electrolyte material is applied to the top of the catalyst after the catalyst penetrates the surface of the second solid polymer electrolyte membrane. The catalyst dispersed may be supported by carbon particles or as catalyst (platinum black or platinum/ruthenium black) not supported by anything.

In the method of fabricating the solid polymer electrolyte fuel cell according to the present invention, the step of fabricating the catalyst layer may include a step of applying, on the gas diffusion layer the catalyst and the second liquid material including the third solid polymer electrolyte material, and a step of allowing the surface of the gas diffusion layer on which the second liquid material is applied to be in contact with the second solid polymer electrolyte membrane. When the second liquid material is applied, the surface of the second solid polymer electrolyte membrane may either be in a fluidized or dried condition.

In the method of fabricating the solid polymer electrolyte fuel cell according to the present invention, the step of forming the second solid polymer electrolyte membrane may be followed by a step of applying pressure to and heating an overlap between the first solid polymer electrolyte membrane and the second solid polymer electrolyte membrane.

In the method of fabricating the solid polymer electrolyte fuel cell according to the present invention, the step of forming the electrode may be followed by a step of applying pressure to and heating an overlap between the second solid polymer electrolyte membrane and the electrode.

In the method of fabricating the solid polymer electrolyte fuel cell according to the present invention, in applying pressure to and heating the overlap, temperature of heating may be the lower of the softening temperature of the first solid polymer electrolyte membrane and that of the second solid polymer electrolyte membrane.

In this way, heating and applying of pressure (hot press) are performed at a temperature appropriate for the material so that the solid polymer electrolyte membrane and the catalyst layer are assembled properly without applying thermal damage to the materials.

In the method of fabricating the solid polymer electrolyte fuel cell according to the present invention, the step of forming the second solid polymer electrolyte membrane may be followed by a first heating and pressuring step of applying pressure to and heating an overlap between the first solid polymer electrolyte membrane and the second solid polymer electrolyte membrane, the step of forming the electrode may be followed by a second heating and pressuring step of applying pressure to and heating an overlap between the second solid polymer electrolyte membrane and the electrode, wherein heating may be performed at a lower temperature in the second heating and pressuring step than in the first heating and pressuring step.

In the method of fabricating a polymer electrolyte fuel cell of this invention, the step of forming the catalytic layer may include a step of applying the second liquid material including catalyst and the third solid polymer electrolyte material to a transfer sheet, and a step of allowing the surface of the transfer sheet to which the liquid material is applied, to be in contact with the second solid polymer electrolyte membrane. The transfer sheet may be formed, for example, of a synthetic resin material such as silicone or teflon (registered trademark). When the second liquid material is applied, the surface of the second solid polymer electrolyte membrane may either be in a fluidized or dried condition. The step of forming the catalytic layer may include a step of allowing the surface of the transfer sheet to which the second liquid material is applied to be in contact with second solid polymer electrolyte membrane, and then tearing off the transfer sheet.

The second solid polymer electrolyte material may be formed of fluorinated polymer. Also, the third solid polymer electrolyte material may be formed of fluorinated polymer. The polymer electrolyte fuel cell of this invention may be a direct methanol fuel cell.

BRIEF DESCRIPTION OF THE DRAWINGS

The above-mentioned and other objectives, features and advantages will be appreciated by referring to the preferred embodiments and the associated drawings that follow.

FIG. 9 shows results produced by examples of the present invention.

BEST MODE FOR CARRYING OUT THE INVENTION (First Embodiment)

A description will now be given of a construction of a solid polymer electrolyte fuel cell according to the embodiments of the present invention.

Figure 1:
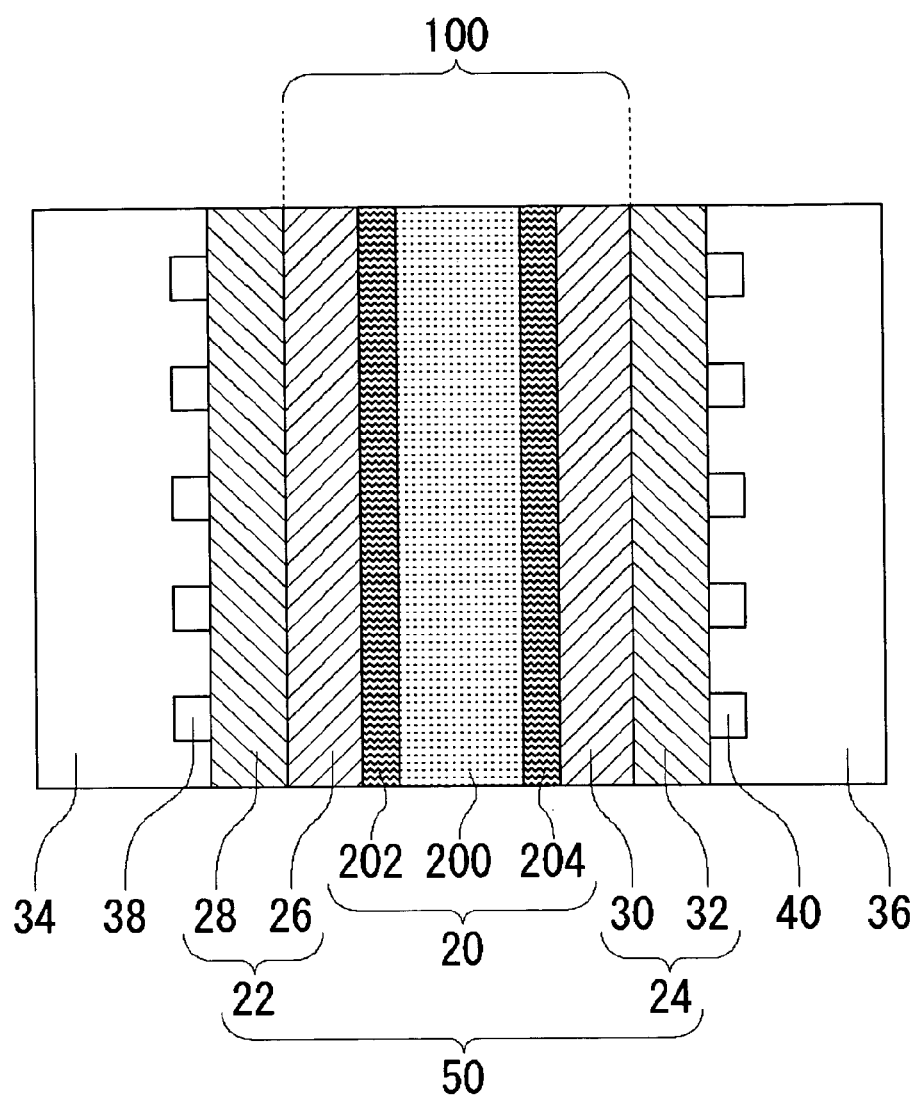
FIG. 1 is a schematic sectional view of a fuel cell according to an embodiment of the present invention.

FIG. 1 schematically shows a cross section of a fuel cell 10 according to the embodiments of the present invention. The fuel cell 10 is provided with a sheet cell 50, and a separator 34 and a separator 36 are provided on respective sides of the cell 50. In this example, only one cell 50 is shown. Alternatively, a laminate of a plurality of cells 50 sandwiching the separator 34 and the separator 36 may be provided to construct the fuel cell 10. The cell 50 has a solid polymer electrolyte membrane 20, a fuel electrode 22 and an air electrode 24. The fuel electrode 22 has a laminate of a catalytic layer 26 and a gas diffusion layer 28, and the air electrode 24 similarly has a laminate of a catalytic layer 30 and a gas diffusion layer 32. The catalytic layer 26 of the fuel electrode 22 and the catalytic layer 30 of the air electrode 24 face each other, sandwiching the solid polymer electrolyte membrane 20.

Gas passages 38 are provided in the separator 34 provided in the fuel electrode 22. Fuel gas or liquid fuel is supplied to the cell 50 via the gas passages 38. For fuel, hydrogen (including hydrogen-rich reformed gas such as natural gas, propane gas, methanol, gasoline, etc.) or methanol (including water solution of methanol) is used. Similarly, gas passages 40 are provided in the separator 36 provided in the air electrode 24. Oxygen is supplied to the cell 50 via the gas passages 40. More specifically, when the fuel cell 10 is operated, fuel is supplied to the fuel electrode 22 via the gas passages and an oxidant gas such as air is supplied to the air electrode 24 via the gas passages 40. With this, electricity generation reaction occurs in the cell 50. When the fuel is supplied to the catalytic layer 26 via the gas diffusion layer 28, hydrogen in the fuel turns into protons (hydrogen ions). These protons travel to the air electrode 24 in the solid polymer electrolyte membrane 20. Electrons discharged in this process move to an external circuit and flow into the air electrode 24 from the external circuit. When the air is supplied to the catalytic layer 30 via the gas diffusion layer 32, atmospheric oxygen is bonded with the protons, producing water. As a result, electrons flow in the external circuit from the fuel electrode 22 to the air electrode 24, producing electric power for retrieval.

The solid polymer electrolyte membrane 20 displays good ionic conductivity in a humid condition and functions as an ion exchange membrane causing the protons to move between the fuel electrode 22 and the air electrode 24. In this embodiment, the solid polymer electrolyte membrane 20 includes the first solid polymer electrolyte membrane 200 and the second solid polymer electrolyte membranes 202 and 204 provided on respective sides thereof. A description will be given later of the solid polymer electrolyte membranes.

The gas diffusion layer 28 in the fuel electrode 22 and the gas diffusion layer 32 in the air electrode 24 have the function of supplying the supplied fuel or air to the catalytic layer 26 and the catalytic layer 30. In addition, they have the function of moving electrical charges occurring as a result of electricity generation reaction to the external circuit and the function of discharging water or unreacting gas outside. Preferably, the gas diffusion layer 28 and the gas diffusion layer 32 are formed by a porous body having electron conductivity and may be formed, for example, of carbon paper, carbon cloth or carbon nonwoven fabric.

Figure 2:
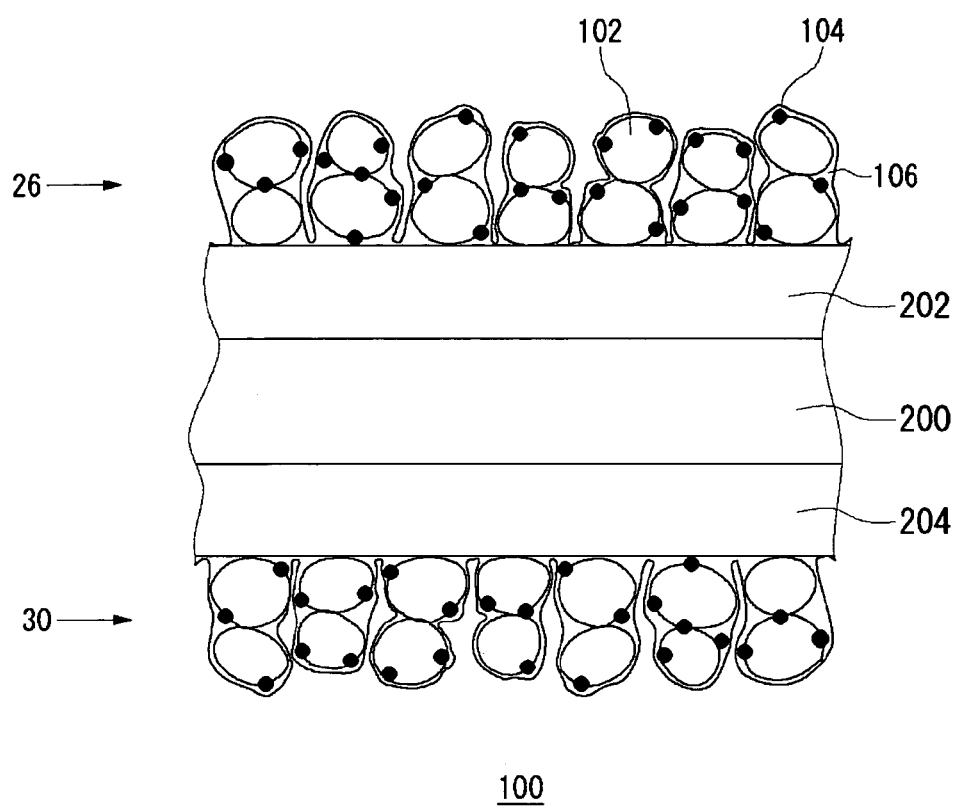
FIG. 2 is a detailed section view of a catalyst layer.

FIG. 2 is a detailed sectional view showing the catalytic layer 26 and the catalytic layer 30 in the fuel electrode 22 and the air electrode 24, respectively. The catalytic layer 26 in the fuel electrode 22 and the catalytic layer 30 in the air electrode 24 are porous for diffusion of gas. An ion exchange resin 106 (third solid polymer electrolyte materials) covers a part or the entirety of a catalyst 104 supported by carbon particles 102, and, due to this construction, conduction of protons or oxygen through the ion exchange resin 106 is possible.

For example, the carbon particles 102 may be implemented by acetylene black, Ketjen Black, furnace black, carbon nanotube, or carbon nanohorn. For example, the catalyst 104 supported by the carbon particles 102 may be implemented by a noble metal such as platinum, gold, silver, ruthenium, rhodium, palladium or an alloy including these.

The ion exchange resin 106 in the catalytic layer 26 and the catalytic layer 30 has the function of conducting protons from the solid polymer electrolyte membrane 20 to the catalyst 104. Therefore, proton conductivity is required of the ion exchange resin 106. In addition, some degree of gas permeability is required of the ion exchange resin 106 in order to diffuse hydrogen or oxygen to the catalyst 104. For example, the ion exchange resin 106 may be formed of a solid polymer electrolyte material of fluorinated polymer.

A description will now be given of the solid polymer electrolyte membrane 20.

In this embodiment, the first solid polymer electrolyte membrane 200 is formed of a material different from the material that forms the second solid polymer electrolyte membranes 202 and 204.

For an example, the first solid polymer electrolyte membrane 200 may be formed of a solid polymer electrolyte material of non-fluorinated polymer. Using a solid polymer electrolyte material of non-fluorinated polymer reduces the cost as well as crossover of fluid fuel such as methanol.

The solid polymer electrolyte material of non-fluorinated polymer may be a substance capable of conducting protons being included in a membrane. Such a substance may be a substituent such as a sulfonate group, a phosphate group, a carboxylic acid function and a phenolic hydroxy group. Alternatively, strongly acidic solution such as sulfuric acid or phosphoric acid may be used. Other choices include inorganic oxide such as tungsten oxide hydrate ($WO_3 \cdot nH_2O$) and molybdenum oxide hydrate ($MoO_3 \cdot nH_2O$), or inorganic solid acid such as tungstophosphoric acid and molybdophosphoric acid. Of these, a sulfonate group and/or a substituent that includes a sulfonate group may preferably be included in the membrane. With these materials, the substituent can be introduced easily and proton conductivity of the solid polymer electrolyte membrane 20 is improved.

According to the present invention, the term "sulfonate group" refers to a substituent such as a sulfonate group represented by formula (3) below or a substituent that includes a sulfonate group represented by formula (3) below.

$$—SO_3H \tag{3}$$

$$—R—SO_3H \tag{4}$$

[In the formulas, R includes a bivalent organic group comprising at least one kind of bond unit selected from a group including alkylene, halogenation alkylene, arylene, halogenation arylene, or includes an ether linkage.]

Alternatively, as the solid polymer electrolyte material of non-fluorinated polymer, substance that includes hydrocarbon system polymer compound may be used. For example, hydrocarbon system polymer compound may be polyacrylamide, polyacrylonitrile, polyarylether sulfone, poly(allyl phenyl ether), polyoxyethylene, polyether ether sulfone, polyetherketone, polyether ketone ketone, polyvinylchloride, poly(diphenyl siloxane), poly(diphenyl phosphazen), polysulphone, polysulfone, polyethersulfone, polyparaphenylene, polyvinyl alcohol, poly(phenylglycidyl ether), poly(phenylmethyl siloxane), poly(phenylmethyl phosphazen), polyphenylene ether, polyphenylene oxide, polyphenylene sulfoxide, polyphenylene sulfide sulfone, poly phenylene sulfone, polybenzimidazole, poly benzoxazole, poly benzothiazole, poly(α-methylstyrene), polystyrene, styrene-(ethylene-butylene) styrene copolymer, styrene-(polyisobutylene)-styrene copolymer, 1,4-poly biphenylene ether ether sulfone, polyarylene ether sulfone, polyetherimide, cyanic acid ester resin, polyethylene, polypropylene, polyamide, polyimide, polyacetal, polybutylene terephthalate, polyethylene terephthalate, syndiotactic poly styrene, polyphenylene sulfide, polyetheretherketone, polyether nitrile.

Of these, it is desirable that the polymer compound may include at least one kind of substance selected from a group including polybenzimidazole, poly benzoxazole, poly benzothiazole, polysulfone, polyether ether sulfone, polyarylether sulfone, poly phenylene sulfone, polyphenylene oxide, polyphenylene sulfoxide, polyphenylene sulfide sulfone, polyparaphenylene, poly etherketone, polyether ketone ketone, cyanic acid ester resin, syndiotactic poly styrene, polyphenylene sulfide, group comprising polyetheretherketone. The proton conductivity, mechanical characteristics, capability to block methanol and chemical stability of the solid polymer electrolyte membrane 20 are improved by using a material such as these.

More preferably, the solid polymer electrolyte membrane 200 is formed of sulfonated polyphenylene sulfide including a structure represented by the following formula. With this, superior proton conductivity, capability to block methanol, mechanical characteristics and chemical stability are obtained.

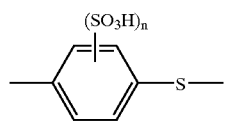

[In the formula, n is an integer of 1–4].

Solvent tolerance of the solid polymer electrolyte membrane 20 is improved so that the performance is improved, by using a solvent insoluble material such as sulfonated polyphenylene sulfide.

The second solid polymer electrolyte membranes 202 and 204 are formed of a material with a softening temperature which is closer to that of the ion exchange resin 106 than that of the first solid polymer electrolyte membrane 200. Softening temperature refers to glass transformation temperature or melting temperature. In this embodiment, the same material as forming the second solid polymer electrolyte membranes 202 and 204 of the solid polymer electrolyte membrane 20 is used to form the ion exchange resin 106 included in the catalytic layer 26 and the catalytic layer 30. With this, it is ensured that the solid polymer electrolyte membrane 20 and the fuel electrode 22 or the air electrode 24 are properly assembled.

For example, the second solid polymer electrolyte membranes 202 and 204 may be formed of a solid polymer electrolyte material of fluorinated polymer. The solid polymer electrolyte material of fluorinated polymer may be perfluorocarbon polymer of a sulfonic acid type, perfluorocarbon polymer having a phosphonic acid group or carboxylic acid function. More specifically, the solid polymer electrolyte material may be perfluoroacid polymers including Nafion (TM) from DuPont, Flemion (TM) from Asahi Glass Company and Aciplex (TM) from Asahi Kasei Corporation.

The second solid polymer electrolyte membranes 202 and 204 are formed by applying fluid dispersion on the first solid polymer electrolyte membrane 200 and then removing a solvent. The fluid dispersion is produced by causing the solid polymer electrolyte material as described above to be dispersed in the solvent or to imbibe the solvent. The solvent may be of any type as long as it is capable of dissolving the target solid polymer electrolyte material or allowing the material to be dispersed in the solvent, and also allowing the material to be removed when the solid polymer electrolyte membrane is produced. The solvent adapted for the kind of second solid polymer electrolyte membrane 202 is used. For example, the solvent may be alcohol such as isopropyl alcohol (IPA), methanol, ethanol, propanol, water or a mixture of these. Alternatively, aprotic polar solvent such as N,N-dimethylformamide, N,N-dimethylacetamide, N-methyl-2-pyrrolidone, and dimethylsulfoxide, alkylene glycol mono alkylether such as ethylene glycol monomethyl ether, ethylene glycol monoethyl ether, propylene glycolmonomethyl ether, and propylene glycolmonoethyl ether, or aromatic system hydrocarbon such as phenol (o-, m-, p-), creosol (o-, m-, p-) and chlorophenol.

In this embodiment, it is particularly desirable the solvent which is imbibed by the solid polymer electrolyte material or in which the solid polymer electrolyte material is dispersed be at least one kind of substance selected from a group comprising isopropyl alcohol, methanol, ethanol, propanol, and water. With this, the second polymer electrolyte membrane 202 and the solid polymer electrolyte membrane 200 are assembled properly so that the performance of the solid polymer electrolyte membrane 20 is improved. Moreover, ease of handling is improved as compared to the related art. Industrial availability is also improved.

The concentration of solid polymer electrolyte material in a liquid material, having the solid polymer electrolyte material forming the second solid polymer electrolyte membranes 202 and 204 being dissolved or diffused in a solvent, is desirably 2% or higher by weight and 20% or lower by weight. By ensuring that the concentration of solid polymer electrolyte material is in such a range, the viscosity of liquid material is controlled to be appropriate and ease of handling is improved. In addition, with this arrangement, the membrane has a desired thickness.

A description will now be given of how the cell 50 is fabricated according to the first embodiment, by referring to FIG. 1 and FIG. 2.

In this embodiment, the electrolyte membrane 100 fitted with catalyst (FIG. 1) is produced by bonding the catalytic layer 26 and the catalytic layer 30 to the respective sides of the solid polymer electrolyte membrane 20 to form an assembly.

First, the catalyst 104 such as platinum is supported by the carbon particle 102 using an impregnation method or a colloid method. The catalyst 104 supported by the carbon particles 102 and the third solid polymer electrolyte material forming the ion exchange resin 106 are diffused in the solvent mentioned above, so as to prepare catalyst ink. Alternatively, catalyst ink may be prepared by diffusing the catalyst and the solvent described above in commercially available ion exchange resin fluid dispersion (for example, Nafion PF SA polymer dispersion from Du Pont).

Furthermore, the solid polymer electrolyte material forming the second solid polymer electrolyte membranes 202 and 204 is diffused in and imbibing the solvent described above, so as to prepare fluid dispersion. The third solid polymer electrolyte material used for catalyst ink, and the solid polymer electrolyte material used in the fluid dispersion to form the second solid polymer electrolyte membranes 202 and 204 may be selected any of solid polymer electrolyte materials such as fluorinated polymer mentioned above. The third solid polymer electrolyte material and the solid electrolyte material may be of the same kind. Alternatively, the materials may be of different kinds with similar glass transformation temperature and melting temperature having favorable mutual adherence. With this, affinity at the interface between the second solid polymer electrolyte membrane 202 and the catalytic layer 26 is improved. Similarly, affinity at the interface between the second solid polymer electrolyte membrane 204 and the catalytic layer 30 is also improved.

A further description will now be given by referring to FIG. 3.

Figure 3A:
FIG. 3 shows a process of fabricating the cell according to an embodiment of the present invention.

First of all, the first solid polymer electrolyte membrane 200 is prepared (FIG. 3(a)). Following this, the fluid dispersion prepared as described above is applied to both sides of the first solid polymer electrolyte membrane 200 by brush application, spray application, screen printing or by using a coating machine.

Alternatively, the first solid polymer electrolyte membrane 200 may be immersed in the fluid dispersion bath so that the solvent component transpires by drying. With this, the second solid polymer electrolyte membranes 202 and 204 are formed. Thickness of the second solid polymer electrolyte membranes 202 and 204 can be controlled by controlling concentration of fluid dispersion and/or thickness of application. It can also be controlled by causing the membrane to pass through a slit having a predetermined opening. Thickness of the second solid polymer electrolyte membranes 202 and 204 is not subject to any restriction and may be set appropriately according to the characteristic properties of the solid polymer electrolyte membrane 20 or the thickness of the first solid polymer electrolyte membrane 200. The solid polymer electrolyte membranes 202 and 204 may preferably be formed such that a lower limit of the thickness of the solid polymer electrolyte membrane 20 being dried is 5 $\mu$m or greater. With this, sufficient strength of the solid polymer electrolyte membrane is maintained. Moreover, it is desirable that the upper limit of the thickness of the solid polymer electrolyte membrane 20 being dried is 200 $\mu$m or less. With this, mobility of protons and water in the solid polymer electrolyte membrane is improved so that high power generating performance is maintained.

Figure 3B:
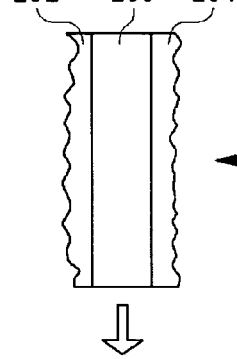
Figure 3C:
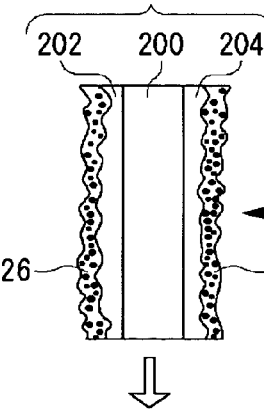

Following this, the first solid polymer electrolyte membrane 200 and the second solid polymer electrolyte membranes 202 and 204 formed in this way are subject to a hot presses process so as to obtain the solid polymer electrolyte membrane 20 (FIG. 3(b)). With this, the first solid polymer electrolyte membrane 200 and the second solid polymer electrolyte membranes 202 and 204 are assembled properly and mutual adherence is improved. The condition under which the hot press process is performed may differ depending on the kind of the solid polymer electrolyte material being used. Temperature and duration of the process is to be chosen such that the membranes are assembled properly and thermal damage applied to a material having lower glass transformation temperature or lower melting temperature is small.

More specifically, the hot press process is to be performed in a temperature range defined by the materials forming the plurality of solid polymer electrolyte membranes constituting the solid polymer electrolyte membrane 20, the lower extreme of which being a temperature higher by about 10° C. than the lowest softening temperature (glass transformation temperature or melting temperature) and the higher extreme being a temperature higher by about 50° C. than the highest softening temperature. As long as proper strength of assembly is obtained, as low temperature as possible is favorable. Preferably, the temperature may be higher by 10° C.–50° C. than the lowest softening temperature. Pressure of 20–100 kgf/cm$^2$ and duration of 5–100 seconds are favorable.

Following this, the catalyst ink prepared beforehand is applied to both sides of the solid polymer electrolyte membrane 20 thus formed by brush application, spray application, screen printing, etc. When the ink is dried, the catalytic layer 26 and the catalytic layer 30 are formed. Following this, the catalytic layer 26, the solid polymer electrolyte membrane 20 and the catalytic layer 30 thus formed are subject to a hot press process so as to obtain the electrolyte membrane 100 fitted with catalyst (FIG. 3(c)). The condition under which the hot press process is performed may differ depending on the kind of the solid polymer electrolyte material being used. The temperature should be higher by 10° C.–50° C. than the softening temperature of the ion exchange resin 106 (FIG. 2) included in the catalytic layer 26 and the catalytic layer 30 as well as the softening temperature of the material forming the second solid polymer electrolyte membranes 202 and 204. Pressure of 20–100 kgf/cm$^2$ and duration of 5–100 seconds are observed.

Moreover, in this embodiment, the second solid polymer electrolyte membranes 202 and 204 and the ion exchange resin 106 may be formed of a material with a softening temperature lower than that of the first solid polymer electrolyte membrane 200. With this, even when the temperature at which the first solid polymer electrolyte membrane 200, and the second solid polymer electrolyte membranes 202 and 204 are subject to a hot press process is lower than the hot press temperature for the catalytic layer 26, the solid polymer electrolyte membrane 20 and the catalytic layer 30, the catalytic layer 26, the catalytic layer 30, with the ion exchange resin 106 included therein, and the solid polymer electrolyte membrane 20 are assembled properly. Thermal damage to the catalytic layer 26 and the catalytic layer 30 can be reduced by lowering the temperature of hot press.

It is desirable that the temperature at which the first solid polymer electrolyte membrane 200, the second solid polymer electrolyte membranes 202 and 204 are subject to a hot press process be higher than the softening temperature of the first solid polymer electrolyte membrane 200. With this, the first solid polymer electrolyte membrane 200 softens in a thermal process and is fluidized so that strength of assembly of the first solid polymer electrolyte membrane 200 and the second solid polymer electrolyte membranes 202 and 204 is improved. Furthermore, it is desirable that temperature at which the catalytic layer 26, the solid polymer electrolyte membrane 20 and the catalytic layer 30 are subject to a hot press process be higher than the softening temperature of the second solid polymer electrolyte membranes 202 and 204. With this, the second solid polymer electrolyte membrane 202 at the interface between the first solid polymer electrolyte membrane 200 and the catalytic layer 26 and the second solid polymer electrolyte membrane 204 at the interface between the first solid polymer electrolyte membrane 200 and the catalytic layer 30 softens in a thermal process and is fluidized so that strength of assembly of the membranes is improved.

Figure 3D:
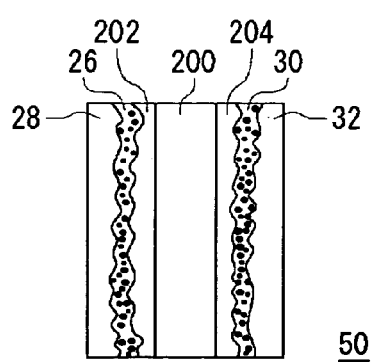

Subsequently, the gas diffusion layer 28 and the gas diffusion layer 32 are provided on both sides of the electrolyte membrane 100 fitted with catalyst thus formed, so as to form the cell 50 (FIG. 3(d)). The hot press process described by referring to FIG. 3(c) may be performed after providing the gas diffusion layer 28 and the gas diffusion layer 32.

Alternatively, the catalytic layer 26 and the catalytic layer 30 may be formed on a side of the gas diffusion layer 28 and the gas diffusion layer 32, respectively, so as to form an electrodes carrying catalyst. In this case, after having made the electrodes fitted with catalyst, the second solid polymer electrolyte membranes 202 and 204 of the solid polymer electrolyte membrane 20 are placed so as to come in contact with the catalytic layer 26 and the catalytic layer 30 of the electrode fitted with catalyst, respectively, whereupon the a hot press process is performed. As a result of this, the cell 50 is obtained.

Figure 4:
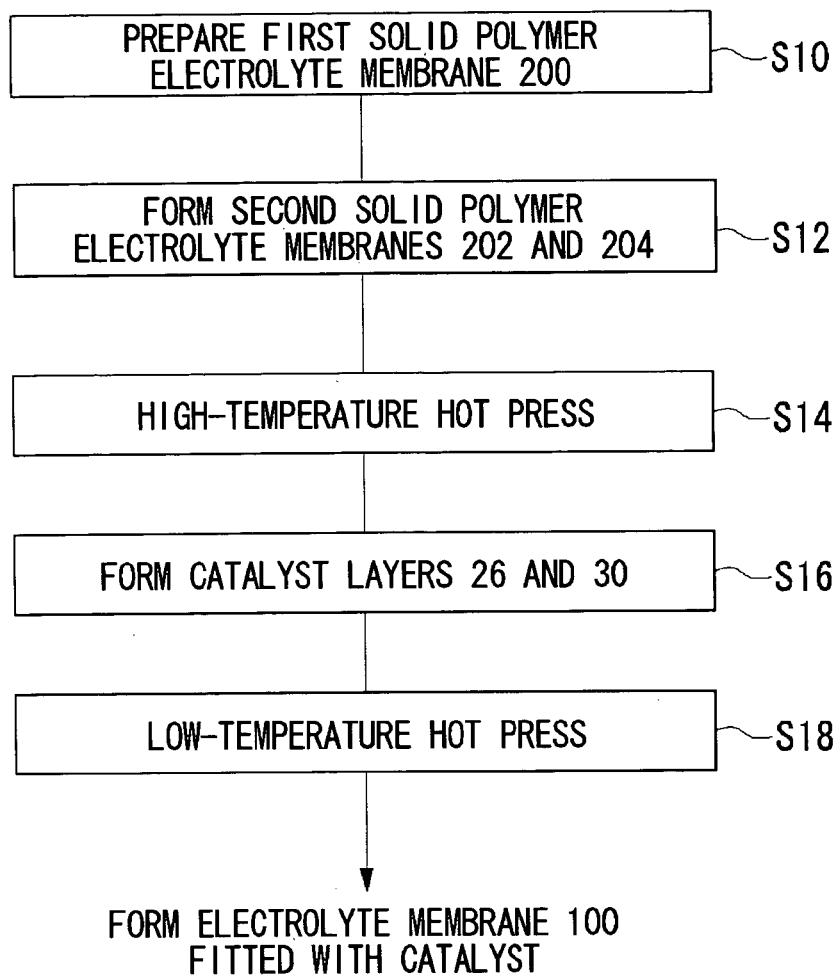
FIG. 4 is a flow chart showing how a fabrication method of the present invention proceeds.

FIG. 4 shows a process performed when polyetheretherketone (PEEK) which is a solid polymer electrolyte material of non-fluorinated polymer is used as a solid polymer electrolyte material forming the first solid polymer electrolyte membrane 200, and when Nafion (registered trademark) is used as a solid polymer electrolyte material forming the second solid polymer electrolyte membranes 202 and 204 and the ion exchange resin 106. Alcohol such as isopropyl alcohol (IPA), ethanol, and propanol, water or a mixture of these may be used for dispersion and imbibing of Nafion. Glass transformation temperature of polyetheretherketone is about 140 degrees Celsius and glass transformation temperature of Nafion is 110–120 degrees Celsius.

First, the first solid polymer electrolyte membrane 200 formed of polyetheretherketone is prepared (S10). Subsequently, fluid dispersion, 5% Nafion PFSA polymer dispersion (from Du Pont), is applied to both sides of the first solid polymer electrolyte membrane 200. After this, the first solid polymer electrolyte membrane 200 is dried at 80 degrees Celsius for three hours, letting the solvent component to transpire, so as to form the second solid polymer electrolyte membranes 202 and 204 (S12). An overlap between these solid polymer electrolyte membranes is subject to a hot press process at a high temperature (about 160 degrees Celsius) higher than glass transformation temperature of polyetheretherketone, so as to obtain the solid polymer electrolyte membrane 20 (S14). Subsequently, catalyst ink including Nafion is applied to both sides of the solid polymer electrolyte membrane 20, so as to form the catalytic layer 26 and the catalytic layer 30 (S16). Following this, an overlap between these is subject to a hot press process at a low temperature (about 140 degrees Celsius) higher than glass transformation temperature of Nafion (S18), so as to form the electrolyte membrane 100.

Figure 8:
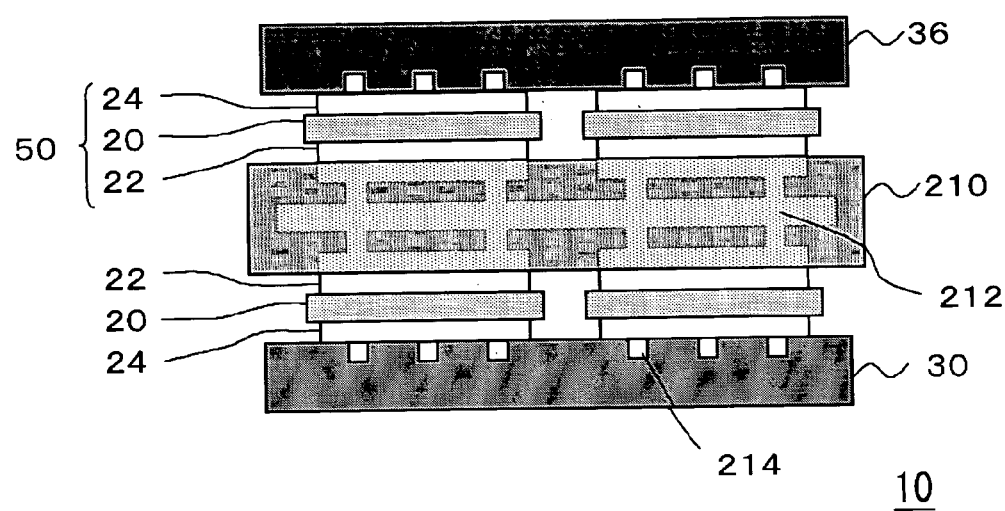
FIG. 8 is a sectional view showing a construction of a fuel cell formed as a stack of cells according to an embodiment of the present invention.

FIG. 8 is a sectional view showing a construction of the fuel cell 10 formed as a stack of cells 50 according to this embodiment. Here, the construction of a fuel cell of a direct type in which methanol is supplied directly to the fuel electrode 22 is shown.

The fuel cell 10 includes a plurality of cells 50. The fuel cell 10 includes a tank 210 including a fuel feed section 212 and a fuel charging section (not shown), and the plurality of cells 50 are in a planar arrangement outside the tank 210 such that the fuel electrode 22 is in contact with the tank 210. Fuel such as methanol and a water solution of methanol fills up the tank 210. The separator 36 in which an oxidizer duct 214 is formed is provided outside the cell 50.

According to the method of fabricating a solid polymer electrolyte fuel cell of this embodiment, even when the solid polymer electrolyte membrane and the ion exchange resin included in the catalytic layer are formed of different materials, strength of assembly of and adherence between the solid polymer electrolyte membrane and the catalytic layer are improved, since the same material as forming the ion exchange resin or a material providing a high degree of adherence with the ion exchange resin is interposed between the solid polymer electrolyte membrane and the catalytic layer. With this, performance of a fuel cell is maintained. Furthermore, even if solid polymer electrolyte membrane is formed of a solid polymer electrolyte material with a relatively high glass transformation temperature or melting temperature, stable production of fuel cell is possible without applying thermal damage to the catalytic layer, since it is not necessary to perform a hot press process at a high temperature in assembling the solid polymer electrolyte membrane and the catalytic layer. Moreover, it is possible to fabricate an inexpensive and highly heat resistant polymer electrolyte fuel cell having a solid polymer electrolyte membrane. Furthermore, it is possible to fabricate a polymer electrolyte fuel cell having a solid polymer electrolyte membrane characterized by low permeability to methanol, even when a fuel cell of a direct type is used.

(Second Embodiment)

In this embodiment, the method of fabricating the electrolyte membrane 100 fitted with catalyst is different from that of the first embodiment. In this embodiment, the fuel cell 10 has a construction similar to that of the first embodiment described by referring to FIGS. 1 and 2. In this and the first embodiment, like components are denoted by like reference symbols and the description thereof is omitted where appropriate.

FIG. 5 shows a process of fabricating the electrolyte membrane 100 fitted with catalyst according to this embodiment. In a similar configuration as the first embodiment, catalyst ink and fluid dispersion are produced according to this embodiment.

Figure 5A:
FIG. 5 shows steps of fabricating a cell according to an embodiment of the present invention.
Figure 5A:
Figure 5B:
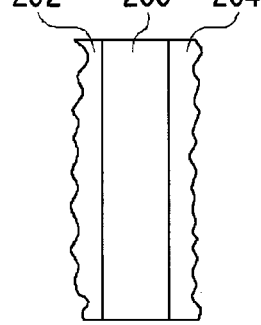
Figure 5B:
Figure 5C:
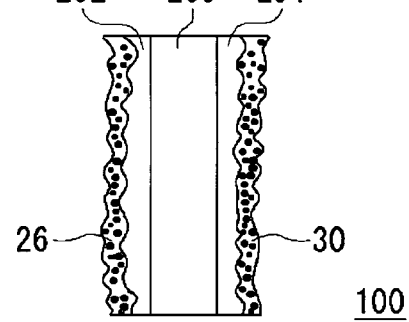
Figure 5C:
Figure 5D:
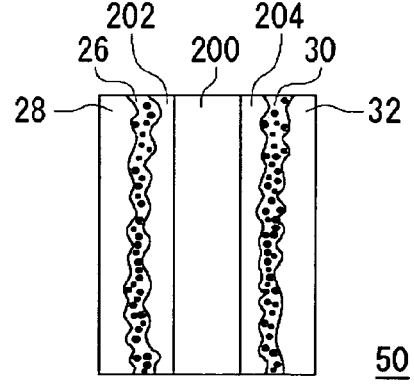

First, the first solid polymer electrolyte membrane 200 is prepared (FIG. 5(a)). Following this, fluid dispersion is applied to both sides of the first solid polymer electrolyte membrane 200 by brush application, spray application, screen printing, etc. Alternatively, the first solid polymer electrolyte membrane 200 may be immersed in the fluid dispersion bath, for example. In this way, the second solid polymer electrolyte membranes 202 and 204 are produced (FIG. 5(b)).

Subsequently, the catalyst ink is applied by brush application, spray application, etc. on a surface of the second solid polymer electrolyte membranes 202 and 204 opposite to the surface in contact with the first solid polymer electrolyte membrane 200, in a state in which the second solid polymer electrolyte membranes 202 and 204 have not been dried completely and in which the surfaces thereof is fluidized. In this way, the catalytic layer 26 and the catalytic layer 30 are formed. Following this, the electrolyte membrane 100 fitted with catalyst is obtained by heating the catalytic layers 26 and 30, and the solid polymer electrolyte membranes 200–204 in a drying furnace or by drying them under a reduced pressure (FIG. 5(c)). Drying temperature and drying time may differ depending on the kind of solid polymer electrolyte material forming the ion exchange resin 106 included in the catalytic layer 26 and the catalytic layer 30 and on the kind of material forming the solid polymer electrolyte membranes 200–204. It is desirable that the temperature and time be set so as to ensure that the solid polymer electrolyte membrane is properly porous and the solvent used for the catalyst ink and fluid dispersion can be removed.

Thereafter, the sides of the electrolyte membrane 100 fitted with catalyst and formed in this way are provided with the gas diffusion layer 28 and the gas diffusion layer 32, thus forming the cell 50 (FIG. 5(*d*)). As in the first embodiment, a hot press process may be performed as necessary, after the electrolyte membrane 100 fitted with catalyst shown in FIG. 5(*c*) is formed or after the cell 50 shown in FIG. 5(*d*) is formed.

Figure 6:
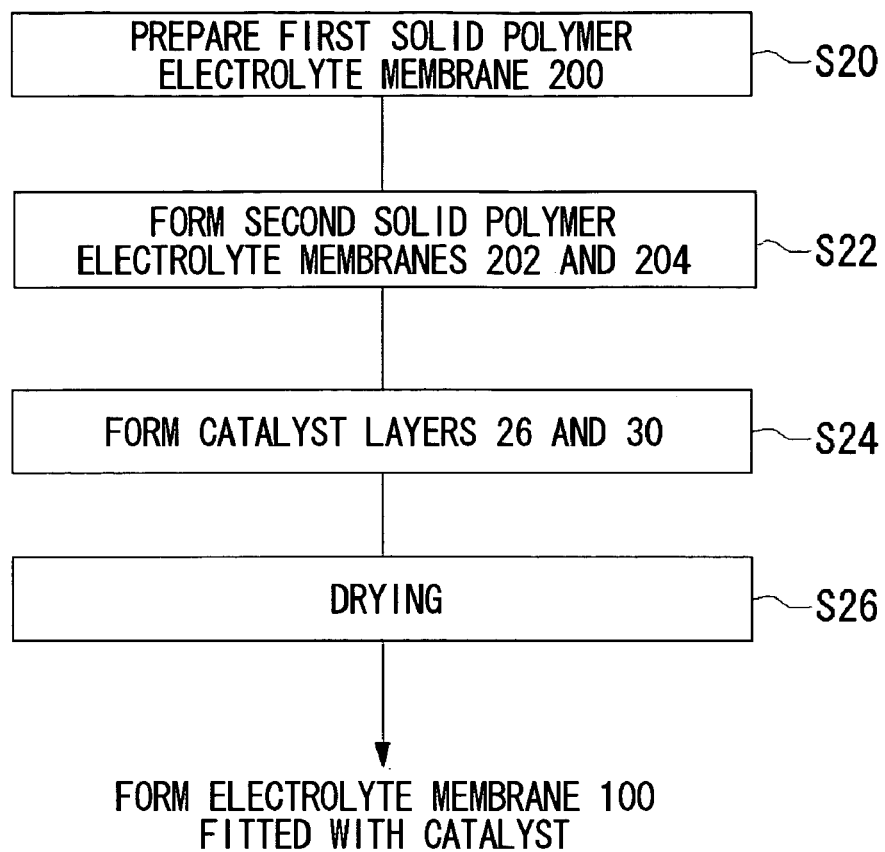
FIG. 6 is a flowchart showing how a fabrication method of the present invention proceeds.
Figure 7A:
FIG. 7 shows steps of fabricating a cell according to an embodiment of the present invention.
Figure 7B:
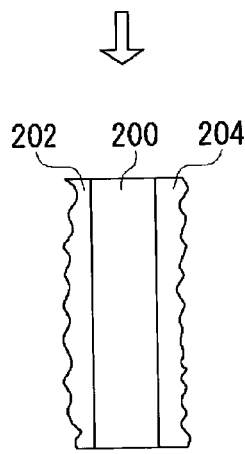
Figure 7C:
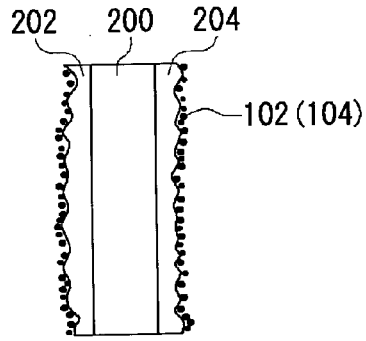
Figure 7D:
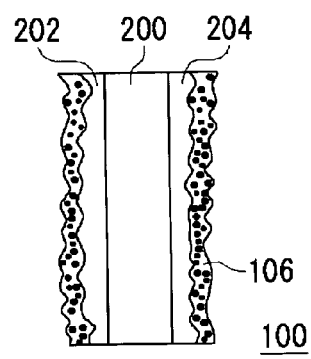
Figure 7E:
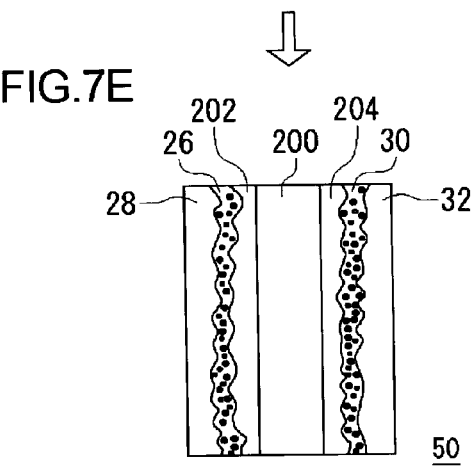

FIG. 6 shows a process performed when polyetheretherketone is used as a solid polymer electrolyte material forming the first solid polymer electrolyte membrane 200, and when Nafion (registered trademark) is used as a third solid polymer electrolyte material forming the second solid polymer electrolyte membranes 202 and 204 and the ion exchange resin 106.

First, the first solid polymer electrolyte membrane 200 formed of polyetheretherketone is prepared (S20). Subsequently, fluid dispersion, 5% Nafion PFSA polymer dispersion (from Du Pont), is applied to both sides of the first solid polymer electrolyte membrane 200 so as to form the second solid polymer electrolyte membranes 202 and 204 (S22). Subsequently, the catalyst ink including Nafion is applied on a surface of the second solid polymer electrolyte membranes 202 and 204 in a state in which the surfaces of the second solid polymer electrolyte membranes 202 and 204 are fluidized. In this way, the catalytic layer 26 and the catalytic layer 30 are formed (S24). Following this, the electrolyte membrane 100 fitted with catalyst is obtained by drying the catalytic layers and the solid polymer electrolyte membranes for five hours at a temperature of 80° C. (S26).

According to the method of fabricating a solid polymer electrolyte fuel cell of this embodiment, even when the solid polymer electrolyte membrane and the ion exchange resin included in the catalytic layer are formed of different materials, strength of assembly of and adherence between the solid polymer electrolyte membrane and the catalytic layer are improved, since the same material as forming the ion exchange resin or a material providing a high degree of adherence with the ion exchange resin is interposed between the solid polymer electrolyte membrane and the catalytic layer. Furthermore, according to the method of fabricating a polymer electrolyte fuel cell of this embodiment, strength of assembly of the solid polymer electrolyte membrane and the catalytic layer is improved since carbon particles supporting the catalyst included in the catalyst ink are buried in the surface of the solid polymer electrolyte membrane having fluidity. With this, area of contact with the catalytic layer is increased and adherence is improved.

(Third Embodiment)

In this embodiment, the method of fabricating the electrolyte membrane 100 fitted with catalyst is different from that of the first and second embodiments. In this embodiment, the fuel cell 10 has a construction similar to that of the first embodiment described by referring to FIGS. 1 and 2. In this and the first embodiment, like components are denoted by like reference symbols and the description are omitted where appropriate.

FIG. 7 shows a process of fabricating the electrolyte membrane 100 fitted with catalyst according to this embodiment. In a similar configuration as the first embodiment, fluid dispersion is produced.

First, the first solid polymer electrolyte membrane 200 is prepared (FIG. 7(*a*)). Following this, the fluid dispersion is applied to both sides of the first solid polymer electrolyte membrane 200 by brush application, spray application, screen printing, etc, so as to form the second solid polymer electrolyte membranes 202 and 204 (FIG. 7(*b*)). Subsequently, the catalyst 104 supported by the carbon particles 102 is applied by spraying to a surface of the second solid polymer electrolyte membranes 202 and 204 opposite to the surface in contact with the first solid polymer electrolyte membrane 200, in a state in which the second solid polymer electrolyte membranes 202 and 204 have not been dried completely and in which the surfaces thereof is fluidized (FIG. 7(*c*)). The catalytic layer 26 and the catalytic layer 30 are then formed by applying, by brush application, spray application, etc., a liquid material including a third solid polymer electrolyte material forming the ion exchange resin 106 to the surface of the second solid polymer electrolyte membranes 202 and 204 to which the catalyst 104 and the carbon particles 102 are sprayed.

Following this, the electrolyte membrane 100 fitted with catalyst is obtained by heating the catalytic layers 26 and 30, and the solid polymer electrolyte membranes 200–204 in a drying furnace. Drying temperature and drying time may differ depending on the kind of solid polymer electrolyte material forming the ion exchange resin 106 included in the catalytic layer 26 and the catalytic layer 30 and on the kind of material forming the solid polymer electrolyte membranes 200–204. It is desirable that the temperature and time be set so as to ensure that the solid polymer electrolyte membrane is properly porous and the solvent used for the catalyst ink and fluid dispersion can be removed.

Thereafter, the electrolyte membrane 100 fitted with catalyst and formed in this way are provided with the gas diffusion layer 28 and the gas diffusion layer 32 at the respective sides, thus forming the cell 50 (FIG. 7(*e*)). As in the first and second embodiments, a hot press process may be performed as necessary, after the electrolyte membrane 100 fitted with catalyst shown in FIG. 7(*d*) is formed or after the cell 50 shown in FIG. 7(*e*) is formed.

FIG. 6 shows a process performed when polyetheretherketone is used as a solid polymer electrolyte material forming the first solid polymer electrolyte membrane 200, and when Nafion (registered trademark) is used as a third solid polymer electrolyte material forming the second solid polymer electrolyte membranes 202 and 204 and the ion exchange resin 106.

First, the first solid polymer electrolyte membrane 200 formed of polyetheretherketone is prepared (S20). Subsequently, 5% Nafion PFSA polymer dispersion (from Du Pont), is applied to both sides of the first solid polymer electrolyte membrane 200 so as to form the second solid polymer electrolyte membranes 202 and 204 (S22). Subsequently, the catalyst 104 supported by the carbon particles 102 is sprayed on the surface of the second solid polymer electrolyte membranes 202 and 204 in a state in which the surfaces of the second solid polymer electrolyte membranes 202 and 204 are fluidized. In this way, the catalyst 104 is attached to the surfaces of the second solid polymer electrolyte membranes 202 and 204. Subsequently, 5% Nafion PFSA polymer dispersion (from Du Pont), is applied to the surfaces of the second polymer electrolyte membranes 202 and 204 on which the catalyst 104 and the carbon particles 102 are attached so as to form the catalyst 26 and the catalyst 30 (S24). The solid polymer electrolyte membranes and the catalyst are dried for five hours at a temperature of about 80° C., so as to form the electrolyte membrane 100 fitted with catalyst (S26).

According to the method of fabricating a solid polymer electrolyte fuel cell of this embodiment, even when the solid polymer electrolyte membrane and the ion exchange resin included in the catalytic layer are formed of different materials, strength of assembly of and adherence between the solid polymer electrolyte membrane and the catalytic layer are improved, since the same material as forming the ion exchange resin or a material providing a high degree of adherence with the ion exchange resin is interposed between the solid polymer electrolyte membrane and the catalytic layer. Furthermore, according to the method of fabricating a polymer electrolyte fuel cell of this embodiment, strength of assembly of the solid polymer electrolyte membrane and the catalytic layer is improved since carbon particles supporting the catalyst included in the catalyst ink are buried in the surface of the solid polymer electrolyte membrane having fluidity. With this, area of contact with the catalytic layer is increased and adherence is improved.

(Fourth Embodiment)

In this embodiment, the fuel cell 10 has a construction similar to that of the first embodiment described by referring to FIGS. 1 and 2.

A description will now be given of a process performed when sulfonated polyphenylene sulfide is used as a solid polymer electrolyte material forming the first solid polymer electrolyte membrane 200, and when Nafion (registered trademark) is used as a third solid polymer electrolyte material forming the second solid polymer electrolyte membranes 202 and 204 and the ion-exchange resin. The solvent which is imbibed by Nafion or in which Nafion is dispersed is at least one kind of substance selected from a group comprising isopropyl alcohol (IPA), methanol, ethanol, propanol and water.

Glass transformation temperature of sulfonated polyphenylene sulfide depends on the quantity of sulfonate group and may be about 160–170° C. Glass transformation temperature of Nafion is about 110–120° C. A further description will be given by referring to FIG. 1.

First, the first solid polymer electrolyte membrane 200 formed of sulfonated polyphenylene sulfide is prepared (S10). For example, the first solid polymer electrolyte membrane 200 may be fabricated as follows. First of all, plasticizer is added to polyphenylene sulfide, which is then subject to a melt extrusion process, so as to produce a polyphenylene sulfide film. The polyphenylene sulfide film is then immersed in chlorosulfonic acid solution and neutralized. The first solid polymer electrolyte membrane 200 formed of sulfonated polyphenylene sulfide is obtained by drying the film.

Subsequently, 5% Nafion PFSA polymer dispersion (from Du Pont), is used as fluid dispersion. The fluid dispersion is applied to both sides of the first solid polymer electrolyte membrane 200 and then dried for one hour at a temperature of 70 C and under a reduced pressure, so as to cause the solvent component to transpire. In this way, the second solid polymer electrolyte membranes 202 and 204 are formed and the solid polymer electrolyte membrane 20 is obtained. Catalyst ink including Nafion is applied to both sides of solid polymer electrolyte membrane 20, so that the catalytic layer 26 and the catalytic layer 30 are formed by drying the ink. Following this, an overlap between these is subject to a hot press process at a temperature of about 150–180 degrees Celsius, so as to form the electrolyte membrane 100 fitted with catalyst. The gas diffusion layer 28 and the gas diffusion layer 32 are then provided as in the first embodiment. As a result, the cell 50 is produced.

Alternatively, the electrode fitted with catalyst may be first produced by forming the catalyst layer 26 and the catalyst layer 30 on one side of the gas diffusion layer 28 and the gas diffusion layer 32, respectively. In this case, after having made the electrode fitted with catalyst, the second solid polymer electrolyte membranes 202 and 204 of the solid polymer electrolyte membrane 20 are placed to face the catalytic layer 26 and the catalytic layer 30 of the electrode, respectively. A hot press process is then performed so as to obtain the cell 50.

In this embodiment, it is desirable that a temperature for the hot press process be higher than glass transformation temperature of the second solid polymer electrolyte membranes 202 and 204. With this, the second solid polymer electrolyte membranes 202 at the interface between the first solid polymer electrolyte membrane 200 and the catalytic layer 26 and the second solid polymer electrolyte membrane 204 at the interface between the first solid polymer electrolyte membrane 200 and the catalytic layer 30 softens in a thermal process and is fluidized so that strength of assembly of the membranes is improved.

Furthermore, it is desirable that temperature for the hot press process is higher than glass transformation temperature of the first solid polymer electrolyte membranes 200. With this, strength of assembly of the first solid polymer electrolyte membrane 200 and the second solid polymer electrolyte membranes 202 and 204 is further improved. When the glass transformation temperature of the first solid polymer electrolyte membrane 200 is significantly higher than the glass transformation temperature of the second solid polymer electrolyte membranes 202 and 204, and when hot press is performed at a temperature higher than the glass transformation temperature the first solid polymer electrolyte membrane 200, the second solid polymer electrolyte membranes 202 and 202 and 204 may suffer thermal damage, resulting in a drop in the performance. Therefore, it is desirable in this case that the hot press process be performed at a temperature that does not cause thermal damage to the second solid polymer electrolyte membranes 202 and 204. According to this embodiment, proper strength of assembly is obtained at a hot press temperature lower than that of the related-art where the solid polymer electrolyte is not provided with the second solid polymer electrolyte membranes 202 and 204. As a result, thermal damage applied to the second solid polymer electrolyte membranes and the ion exchange resin 106 in the catalytic layer is reduced.

According to the method of fabricating a solid polymer electrolyte fuel cell according to this embodiment, even when the solid polymer electrolyte membrane and the ion exchange resin included in the catalytic layer are formed of different materials, strength of assembly of and adherence between the solid polymer electrolyte membrane and the catalytic layer is improved, since the same material as forming the ion exchange resin or a material providing a high degree of adherence with the ion exchange resin is interposed between the solid polymer electrolyte membrane and the catalytic layer. Moreover, a material insoluble to solvent such as polyphenylene sulfide may be used as a material forming the first solid polymer electrolyte membrane 200 since the first solid polymer electrolyte membrane 200 is formed by melt extrusion in this embodiment. With this, solvent tolerance of the solid polymer electrolyte membrane 20 is improved so that the performance of the solid polymer electrolyte membrane 20 is improved.

EXAMPLES

Specific examples of reducing the present invention into practice will be explained. However, the present invention is not limited to these examples and variations are possible without changing the scope of the present invention.

Example 1

The electrolyte membrane 100 fitted with catalyst was produced in the same manner as the first embodiment.

First of all, the solid polymer electrolyte membrane in which polyetheretherketone is used as the first solid polymer electrolyte membrane 200 was produced as follows. Polyetheretherketone (from Sumitomo Chemical Co. Ltd.) was added to fuming sulfuric acid and sulfonated so as to obtain sulfonated polyetheretherketone was got. The sulfonated polyetheretherketone is then cleansed, dried and crushed. The result of crushing is dissolved in N-methylpyrrolidone so as to produce a sulfonated polyetheretherketone solution. This solution is cast in a teflon sheet, so as to produce the solid polymer electrolyte membrane (thickness: 60 $\mu$m, glass transformation temperature: 140° C.).

Fluid dispersion, 5% Nafion PFSA polymer dispersion (from Du Pont), is applied to one side of the first solid polymer electrolyte membrane 200, so as to form the second solid polymer electrolyte membrane 202 (thickness: 20 m). Following this, an overlap between these is subject to a hot press process for about ten seconds at a temperature of about 160° C. and at a pressure of 50 kgf/cm$^2$. Subsequently, catalyst ink including 5% Nafion PFSA polymer dispersion (from Du Pont) is applied to the surface of the second solid polymer electrolyte membrane 202, so as to form the catalyst layer 26 (thickness: 40 $\mu$m). Following this, an overlap between these is subject to a hot press process for about thirty seconds at a temperature of about 140° C. and at a pressure of 50 kgf/cm$^2$.

Example 2

The electrolyte membrane 100 fitted with catalyst was produced in the same manner as described in the second embodiment.

First, the first solid polymer electrolyte membrane 200 formed of polyetheretherketone is prepared as in the first example. Subsequently, fluid dispersion, 5% Nafion PFSA polymer dispersion (from Du Pont), is applied to one side of the first solid polymer electrolyte membrane 200 so as to form the second solid polymer electrolyte membrane 202 (thickness 20 $\mu$m). Subsequently, catalyst ink including 5% Nafion PFSA polymer dispersion (from Du Pont) is applied on a surface of the second solid polymer electrolyte membrane 202, in a state in which the surface of the second solid polymer electrolyte membrane 202 is fluidized. In this way, the catalytic layer 26 (thickness 40 $\mu$m) was formed. The formation is then dried for five hours at a temperature of about 80° C.

Comparative Example 1

In a similar configuration as the first example, the first solid polymer electrolyte membrane 200 formed of polyetheretherketone is fabricated. Catalyst ink including 5% Nafion PFSA polymer dispersion (from Du Pont) is applied. The membrane is then heated and dried, so as to form the catalytic layer 26 (thickness: 40 $\mu$m). It is then ensured that one of the sides of the first solid polymer electrolyte membrane 200 contacts the surface on which the catalytic layer is formed. A hot press process is then performed for about sixty seconds at a temperature of about 160° C. and at a pressure of 50 kgf/cm$^2$. With this, the catalytic layer 26 was transferred to the first solid polymer electrolyte membrane 200. The teflon sheet was removed from the catalytic layer 26 after the catalytic layer 26 has been transferred.

The electrolyte membranes fitted with catalyst fabricated in the examples 1 and 2 are immersed in water for one hour and removed therefrom. Drops of water were removed by a waste cloth and the membrane was air-dried. Experiments were performed to exfoliate the catalytic layer from the first solid polymer electrolyte membrane 200 with an adhesive tape so that ease of exfoliation was observed. The experiments proved that the catalytic layer is more resistant to exfoliation in the examples 1 and 2 than in the comparative example.

Example 3

The first solid polymer electrolyte membrane 200 formed of sulfonated polyphenylene sulfide was fabricated as follows. To one hundred parts by weight of polyphenylene sulfide (from Dainippon Ink and Chemicals, product name: DIC-PPS, FZ-2200-A5), two parts by weight of tricresyl phosphate (from Daihachi Chemical Industry Co., Ltd, product name:, TCP) was added as plasticizer. The mixture is melt-blended using a double-spindle extruder heated at a temperature of 280° C., so as to obtain a pellet of a desired mixture. The mixture was melt-extruded using an extruder at a screw temperature of 290° C. and T-die temperature of 320° C., so as to form a polyphenylene sulfide film of a thickness of 50 $\mu$m.

Subsequently, chlorosulfonic acid solution including 671 g of dichloro-methane and 4.51 g of chlorosulfonic acid was prepared. 2.09 g of polyphenylene sulfide film thus prepared was immersed in the above chlorosulfonic acid solution and left at rest at a room temperature for twenty hours (the equivalent weight proportion of chlorosulfonic acid to an aromatic unit of polyphenylene sulfide is two). After being left to rest, the polyphenylene sulfide film was retrieved and cleansed with ion-exchange water before so as to be neutralized.

Under humidity control for relative humidity of 98%, 80%, 60% and 50% and using a thermohygrostat controlled at 23° C., the polyphenylene sulfide film thus cleansed was dried by being left to rest for thirty minutes at each condition, In this way, the first solid polymer electrolyte membrane 200 (80 mm×80 mm, thickness: 60 $\mu$m, glass transformation temperature: about 170° C.) formed of sulfonated polyphenylene sulfide was obtained.

A solution of 5% Nafion PFSA polymer dispersion (from Du Pont, glass transformation temperature: 110–120° C.), is used as a material forming the second solid polymer electrolyte membranes 202 and 204. The surface of the solid polymer electrolyte membrane 200 is uniformly coated with 0.77 g of the solution dropped thereon using a brush (per volume weight of the solution is 0.6 mg/cm$^2$). The coated surface is fixed on glass facing upward and then dried for one hour at a temperature of 70° C. and under a reduced pressure. The solvent is removed, resulting in a laminate of the second solid polymer electrolyte membrane 202 on the first solid polymer electrolyte membrane 200. The second solid polymer electrolyte membrane 204 is similarly provided on the other surface of the first solid polymer electrolyte membrane 200, thus producing the solid polymer electrolyte membrane 20.

The cell 50 is fabricated as described below, using the solid polymer electrolyte membrane 20, the fuel electrode 22, the air electrode 24 and the ion exchange resin. The fuel electrode 22 and the air electrode 24 are implemented by a commercially available gas diffusion electrode fitted with catalyst (EC-20-10-7 from ElectroChem). The ion exchange resin is implemented by Nafion (from DuPont). The sides of the solid polymer electrolyte membrane 20 (20 mm×20 mm) were sandwiched by the fuel electrode 22 and the air electrode 24 (each having a dimension of 10 mm×10 mm), and the assembly is subject to a hot press process for about sixty seconds at a pressure of 50 kgf/cm2 and at a temperature of 150° C., thus producing the cell 50.

Example 4

Same as example 3 except that the hot press temperature is 180° C.

Example 5

Same as example 3 except that the hot press temperature is 170° C.

Example 6

Same as example 3 except that an addition hot press process, lasting about ten seconds at a temperature of 180° C. and at a pressure of 50 kgf/cm², is performed after fabricating the solid polymer electrolyte membrane 20.

Example 7

Same as example 3 except that sulfonation polyetheretherketone fabricated in the first embodiment is used to form first solid polymer electrolyte membrane 200 instead of sulfonated polyphenylene sulfide, and the hot press temperature is 130° C.

Example 8

Same as example 5 except that the hot press temperature is 150° C.

Comparative Example 2

Same as example 3 except that the second solid polymer electrolyte membranes 202 and 204 are not stacked.

Comparative Example 3

Same as example 4 except that the second solid polymer electrolyte membranes 202 and 204 are not stacked.

Comparative Example 4

Same as example 7 except that the second solid polymer electrolyte membranes 202 and 204 are not stacked.

Comparative Example 5

Same as example 8 except that the second solid polymer electrolyte membranes 202 and 204 are not stacked.

The cell 50 fabricated by the method described above is immersed in water for three hours and visually observed to determine whether exfoliation occurs in the solid polymer electrolyte membrane 20 (evaluation method 1). The cell 50 is immersed in boiled water for one hour and visually observed (evaluation method 2). FIG. 9 shows results of the evaluation.

Referring to FIG. 9, comparison between the examples 3–8 and the comparative examples 2–5 revealed that the solid polymer electrolyte membrane in the examples ensure favorable adherence to the fuel electrode 22 and the air electrode 24, as compared to the related-art solid polymer electrolyte membrane. The fuel electrode 22 and the air electrode 24 are not exfoliated in water. According to the method of this embodiment, a membrane-electrode assembly properly assembling the solid polymer electrolyte membrane and the electrodes is obtained.

Comparison between the examples 4–6 and the comparative example 3 revealed that the solid polymer electrolyte membrane in the examples ensure that exfoliation of the fuel electrode 22 and the air electrode 24 in the boiling water does not occur even when the hot press process is performed at a temperature lower than that of the related-art solid polymer electrolyte membrane, and that the cell in which the solid polymer electrolyte membrane and the electrodes are properly assembled is fabricated without applying thermal damage to the solid polymer electrolyte material with a low glass transformation temperature.

The present invention has been described reciting the embodiments. The description of the embodiments is illustrative in nature and various variations in constituting elements and processes involved are possible. Those skilled in the art would readily appreciate that the variations are also within the scope of the present invention.

In the foregoing embodiments, the second solid polymer electrolyte membranes 202 and 204 were described as being formed using fluid dispersion prepared by diffusing a solid polymer electrolyte material in and imbibing solvent. Alternatively, the second solid polymer electrolyte membranes 202 and 204 may be produced by melting the solid polymer electrolyte material itself. The effects achieved are the same as when the fluid dispersion is used.

The electrolyte membrane 100 fitted with catalyst in the foregoing embodiments may also be formed as described below. As described in the first through third embodiments, an assembly in which the second solid polymer electrolyte membranes 202 and 204 are formed on both sides of the first solid polymer electrolyte membrane 200 is formed. Subsequently, the gas diffusion layer 28 and the gas diffusion layer 32 are formed by screen printing, or transfer sheets such as teflon sheet are coated with the catalytic layer 26 and the catalytic layer 30 before drying. The assembly is then sandwiched between the gas diffusion layer 28 and the gas diffusion layer 32, or between surfaces of the transfer sheets such as teflon sheets on which the catalytic layer 26 and the catalytic layer 30 are formed. A hot press process is then performed. When the gas diffusion layer 28 and the gas diffusion layer 32 are used, the assembly including these layers constitutes the cell 50. When a transfer sheet such as a teflon sheet is used, the electrolyte membrane 100 fitted with catalyst is formed by tearing off the teflon sheet after the hot press process. The cell 50 is then formed by providing the gas diffusion layer 28 and the gas diffusion layer 32.

In the foregoing embodiments, the second solid polymer electrolyte membranes 202 and 204 are described as being formed of the same material as used to form the ion exchange resin 106 of the catalytic layer 26 and 30. The solid polymer electrolyte material forming the second solid polymer electrolyte membranes 202 and 204 may have glass transformation temperature and melting temperature intermediate between those of the material forming the first solid polymer electrolyte membrane 200 and those of the material forming the ion exchange resin 106.

The solid polymer electrolyte fuel cell is applicable not only to a case where the materials forming the solid polymer electrolyte membrane and the ion exchange resin in the catalytic layer are the same but also to a case where the materials are similar but have different degrees of crosslinking.

Additives such as plasticizer, stabilizer and mold lubricant may be added to the solid polymer electrolyte material when the solid polymer electrolyte membrane is formed.

The first solid polymer electrolyte membrane 200 may also be formed of a solid polymer electrolyte material of fluorinated polymer, and the second solid polymer electrolyte membranes 202 and 204 may be formed of a solid polymer electrolyte material of non-fluorinated polymer. Each of the first solid polymer electrolyte membrane 200, and the second solid polymer electrolyte membranes 202 and 204 may be formed of a solid polymer electrolyte material of non-fluorinated polymer.

Although the catalyst was described as being supported by carbon particles in the foregoing embodiments, the catalyst may be implemented by platinum black or the platinum/ruthenium black instead of being supported by an extra material.

The present invention provides a solid polymer electrolyte fuel cell and a method of fabricating the same, in which the membrane and the catalyst are assembled properly, even when the solid polymer electrolyte membrane and the catalytic layer are formed of different solid polymer electrolyte materials. The present invention also provides an inexpensive and highly heat resistant polymer electrolyte fuel cell having a solid polymer electrolyte membrane, and a method of fabricating the same. The present invention ensures that there is a sufficient area at the interface between the solid polymer electrolyte membrane and the catalytic layer even when the slid polymer electrolyte membrane and the ion exchange resin in the catalytic layer have different glass transformation temperature and melting temperature. Thermal damage is not applied to the component formed of a material with lower glass transformation temperature and melting temperature so that stable production of a fuel cell is possible. In accordance with the present invention, it is possible to fabricate a solid polymer electrolyte fuel cell having a solid polymer electrolyte membrane with low methanol permeability.

The invention claimed is:

1. A solid polymer electrolyte membrane used in a solid polymer electrolyte fuel cell, comprising:
   a first solid polymer electrolyte membrane; and
   a second solid polymer electrolyte membrane provided at least on one surface of said first solid polymer electrolyte membrane and formed of a material different from that for said first solid polymer electrolyte membrane, wherein
   said first solid polymer electrolyte membrane is formed of sulfonated polyphenylene sulfide including a configuration represented by the following general formula,

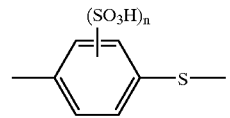

where n is an integer between 1 and 4.

2. The solid polymer electrolyte membrane according to claim 1, wherein
   said first solid polymer electrolyte membrane is formed of a material having softening temperature higher than that of the material forming the second solid polymer electrolyte membrane.

3. The solid polymer electrolyte membrane according to claim 1, wherein
   said first solid polymer electrolyte membrane is formed of a solid polymer electrolyte material of non-fluorinated polymer.

4. The solid polymer electrolyte membrane according to claim 1 through 3, wherein
   said second solid polymer electrolyte membrane is formed of a solid polymer electrolyte material of fluorinated polymer.

5. A solid polymer electrolyte fuel cell comprising:
   a solid polymer electrolyte membrane;
   an electrode provided on said solid polymer electrolyte membrane, wherein
   said solid polymer electrolyte membrane includes:
   a first solid polymer electrolyte membrane;
   a second solid polymer electrolyte membrane provided between said electrode and said first solid polymer electrolyte membrane and formed of a material different from a material forming said first solid polymer electrolyte membrane, wherein:
   said electrode includes catalyst and a third solid polymer electrolyte material having softening temperature closer to that of said second solid polymer electrolyte membrane than that of said first solid polymer electrolyte membrane; and
   said first solid polymer electrolyte membrane is formed of sulfonated polyphenylene sulfide including a configuration represented by the following general formula,

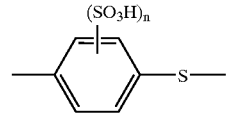

where n is an integer between 1 and 4.

6. The solid polymer electrolyte fuel cell according to claim 5, wherein
   said second solid polymer electrolyte membrane is formed of the same material as the third solid polymer electrolyte membrane.

7. The solid polymer electrolyte fuel cell according to claim 5, wherein
   said first solid polymer electrolyte membrane is formed of a material having softening temperature higher than that of the material forming the second solid polymer electrolyte membrane.

8. The solid polymer electrolyte fuel cell according to claim 5, wherein
   said first solid polymer electrolyte membrane is formed of a solid polymer electrolyte material of non-fluorinated polymer.

9. The solid polymer electrolyte fuel cell according to claim 5, wherein
said second solid polymer electrolyte membrane is formed of a solid polymer electrolyte material of fluorinated polymer.

10. A method of fabricating a solid polymer electrolyte membrane used for a solid polymer electrolyte fuel cell, comprising the step of:
forming, at least on one side of a first solid polymer electrolyte membrane, the second solid polymer electrolyte membrane formed of a second solid polymer electrolyte different from that of the first polymer electrolyte membrane, wherein
said first solid polymer electrolyte membrane is formed of sulfonated polyphenylene sulfide including a configuration represented by the following general formula,

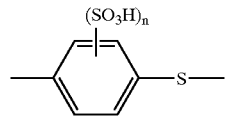

where n is an integer between 1 and 4.

11. The method of fabricating a solid polymer electrolyte membrane according to claim 10, wherein
said step of forming the second solid polymer electrolyte membrane includes a step of applying, to at least one surface of the first solid polymer electrolyte membrane, a first liquid material that includes the second solid polymer electrolyte material and solvent dissolving the second solid polymer electrolyte material or allowing the second solid polymer electrolyte material to be dispersed in the solvent.

12. The method of fabricating a solid polymer electrolyte membrane according to claim 11, wherein
concentration of the second solid polymer electrolyte material in the first liquid material is from 2% by weight to 20% by weight.

13. A method of fabricating a solid polymer electrolyte fuel cell, comprising steps of:
forming, at least on one side of a first solid polymer electrolyte membrane, a second solid polymer electrolyte membrane formed of a second solid polymer electrolyte material different from that of the first polymer electrolyte membrane; and
forming an electrode that includes catalyst and a third solid polymer electrolyte material, on the second solid polymer electrode membrane, wherein:
the second solid polymer electrolyte material has softening temperature closer to that of the third solid polymer electrolyte material than that of the first solid polymer electrolyte membrane; and
said first solid polymer electrolyte membrane is formed of sulfonated polyphenylene sulfide including a configuration represented by the following general formula,

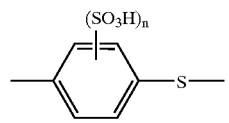

where n is an integer between 1 and 4

14. The method of fabricating a solid polymer electrolyte fuel cell according to claim 13, wherein
said step of forming the second solid polymer electrolyte membrane includes a step of applying, to at least one surface of the first solid polymer electrolyte membrane, a first liquid material that includes the second solid polymer electrolyte material and solvent dissolving the second solid polymer electrolyte material or allowing the second solid polymer electrolyte material to be dispersed in the solvent.

15. The method of fabricating a solid polymer electrolyte fuel cell according to claim 14, wherein
concentration of the second solid polymer electrolyte material in the first liquid material is from 2% by weight to 20% by weight.

16. The method of fabricating a solid polymer electrolyte fuel cell according to claim 13, wherein
the third solid polymer electrolyte material is the same as the second solid polymer electrolyte material.

17. The method of fabricating a solid polymer electrolyte fuel cell according to claim 13, wherein
said step of forming the electrode is performed in a state in which the surface of the second solid polymer electrolyte membrane is in a fluidized condition.

18. The method of fabricating a solid polymer electrolyte fuel cell according to claim 13, wherein
a second liquid material that includes the catalyst and the third solid polymer electrolyte material is applied to the surface of the second solid polymer electrolyte membrane.

19. The method of fabricating a solid polymer electrolyte fuel cell according to claim 13, wherein
said step of forming the electrode includes a step of dispersing the catalyst on the surface of the second solid polymer electrolyte membrane, and a step of applying a second liquid material that includes the third solid polymer electrolyte material to the surface of the second solid polymer electrolyte membrane on which the catalyst is diffused.

20. The method of fabricating a solid polymer electrolyte fuel cell according to claim 13, wherein said step of forming the second solid polymer electrolyte membrane is followed by a step of applying pressure to and heating an, overlap between the first solid polymer electrolyte membrane and the second solid polymer electrolyte membrane.

21. The method of fabricating a solid polymer electrolyte fuel cell according to claim 13, wherein
said step of forming the electrode is followed by a step of applying pressure to and heating an overlap between the second solid polymer electrolyte membrane and the electrode.

22. The method of fabricating a solid polymer electrolyte fuel cell according to claim 13, wherein
said step of forming the second solid polymer electrolyte membrane is followed by a first heating and pressuring step of applying pressure to and heating an overlap between the first solid polymer electrolyte membrane and the second solid polymer electrolyte membrane,
said step of forming the electrode is followed by a second heating and pressuring step of applying pressure to and heating an overlap between the second solid polymer electrolyte membrane and the electrode, wherein
heating is performed at a lower temperature in the second heating and pressuring step than in the first heating and pressuring step.

* * * * *